US011656844B2

(12) United States Patent
Maltsev et al.

(10) Patent No.: US 11,656,844 B2
(45) Date of Patent: *May 23, 2023

(54) PROVIDING A COMMUNICATIONS CHANNEL BETWEEN INSTANCES OF AUTOMATED ASSISTANTS

(71) Applicant: GOOGLE LLC, Mountain View, CA (US)

(72) Inventors: Alexandr Maltsev, Mountain View, CA (US); Vikram Aggarwal, Palo Alto, CA (US); Moises Morgenstern Gali, San Francisco, CA (US); Joseph Pirozzo, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/360,404

(22) Filed: Jun. 28, 2021

(65) Prior Publication Data

US 2021/0326104 A1 Oct. 21, 2021

Related U.S. Application Data

(63) Continuation-in-part of application No. 16/881,463, filed on May 22, 2020, now Pat. No. 11,086,598,
(Continued)

(51) Int. Cl.
*H04L 29/08* (2006.01)
*G06F 3/16* (2006.01)
(Continued)

(52) U.S. Cl.
CPC ............ *G06F 3/167* (2013.01); *B60K 35/00* (2013.01); *G07C 5/008* (2013.01); *G10L 15/22* (2013.01);
(Continued)

(58) Field of Classification Search
CPC ..................................................... H04L 67/18
See application file for complete search history.

(56) References Cited

U.S. PATENT DOCUMENTS

2007/0042812 A1 2/2007 Basir
2010/0127847 A1* 5/2010 Evans ................. G06F 3/04886
345/173
(Continued)

OTHER PUBLICATIONS

Non-Final Office Action for U.S. Appl. No. 16/881,463 dated May 27, 2021 (7 pages).
(Continued)

*Primary Examiner* — Adnan M Mirza
(74) *Attorney, Agent, or Firm* — Dority & Manning, P.A.

(57) ABSTRACT

Implementations relate to interactions, over a wireless communication modality, between an automated assistant of an automobile computer system, and separate client device(s). In some of those implementations, the client device(s) can be paired with the automobile computer system, and the client device(s) and the automobile computer system can include separate instances of an automated assistant, which can be associated with different user accounts. In some additional or alternative implementations, particular actions to be performed by a local application of a client device can be advanced via user interaction with the automobile automated assistant, despite a counterpart to the local application not being installed directly on automobile computer system. For example, despite an automobile computer system not having a third-party messaging application installed, the automobile automated assistant can access requested actions to be performed by the third-party messaging application in order to further a requested action. The automobile computer system can transmit, via the wireless communication modality, content to cause the third-party application to further the requested action.

20 Claims, 10 Drawing Sheets

Related U.S. Application Data which is a continuation of application No. 16/157,751, filed on Oct. 11, 2018, now Pat. No. 10,691,409, which is a continuation-in-part of application No. 16/009,116, filed on Jun. 14, 2018, now Pat. No. 10,198,877.

(60) Provisional application No. 62/675,342, filed on May 23, 2018.

(51) Int. Cl.
  *G10L 15/22* (2006.01)
  *G07C 5/00* (2006.01)
  *B60K 35/00* (2006.01)

(52) U.S. Cl.
  CPC .. *B60K 2370/148* (2019.05); *G10L 2015/223* (2013.01)

(56) References Cited

U.S. PATENT DOCUMENTS

| | | |
|---|---|---|
| 2010/0184406 A1 | 7/2010 | Schrader |
| 2013/0117021 A1 | 5/2013 | James |
| 2014/0309868 A1* | 10/2014 | Ricci ................. G06Q 30/0633 701/36 |

OTHER PUBLICATIONS

Notice of Allowance for U.S. Appl. No. 16/009,116 dated Sep. 20, 2018 (18 pages).
Notice of Allowance for U.S. Appl. No. 16/157,751 dated Feb. 5, 2020 (10 pages).
Notice of Allowance for U.S. Appl. No. 16/881,463 dated Jun. 15, 2021 (5 pages).

* cited by examiner

PROVIDING A COMMUNICATIONS CHANNEL BETWEEN INSTANCES OF AUTOMATED ASSISTANTS

CROSS-REFERENCE TO RELATED APPLICATIONS

The present application claims the benefit of priority under 35 U.S.C. § 120 as a continuation of U.S. patent application Ser. No. 16/881,463, filed May 22, 2020, which claims the benefit of priority under 35 U.S.C. § 120 as a continuation of U.S. patent application Ser. No. 16/157,751, filed Oct. 11, 2018, which claims the benefit of priority under 35 U.S.C. § 120 as a continuation-in-part of U.S. patent application Ser. No. 16/009,116, filed Jun. 14, 2018, which claims the benefit of priority, under 35 USC § 119(e), to the filing of U.S. Provisional Patent Application 62/675,342, filed May 23, 2018. Each of the foregoing applications are hereby incorporated by reference in their entirety.

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input.

Automated assistants can be installed at a variety of different devices such as, for example, mobile phones and personal computers. A user can cause a particular application at a mobile phone or a personal computer to perform a particular action by interacting with a respective automated assistant. However, in order to exhibit uniformity of functionality across different devices, a user may be required to install instances of the same application synchronously across the different devices. As a result, network bandwidth may be quickly preoccupied with transmitting duplicative application updates for each instance of the application and generally communicating data between each instance of the application. Moreover, as each instance of the application may require some amount of disk space on their respective device, memory allocation across devices may be employed inefficiently.

In some contexts, interacting with a particular application via an automated assistant may not be convenient depending on how engaged a user may be in a particular environment, and/or whether other devices are being operated by other users nearby. For instance, replying to messages via an automated assistant on a mobile phone can be difficult while the user is driving in a vehicle. Furthermore, when the user is driving with other people in the vehicle, those people may also have devices with automated assistants, which may be indirectly invoked as the user engages with their respective automated assistant. Such a result can create an environment of heightened distractions while driving, and waste computational resources at those devices that may be inadvertently affected.

SUMMARY

Implementations set forth herein relate to systems, methods, and apparatuses for providing a communications channel through which separate instances or installations of automated assistants can communicate in order to further a particular action. The communications channel can be provided between a principal automated assistant (e.g., either an automobile automated assistant or a client device automated assistant) and one or more subsidiary automated assistants (e.g., the other of the automobile automated assistant and the client device automated assistant). For instance, a principal automated assistant can be one that is preferred by a user in a particular context, such as riding in an automobile. Specifically, an automobile computer system can include an automated assistant that is preferred by a user for furthering particular actions while the user is riding in the vehicle. According to settings of the automobile and/or a client device, the automobile automated assistant, as principal, can assume any pending intents and/or actions of a subsidiary automated assistant when the client device connects to the automobile computer system. In this way, the automobile automated assistant can act as an extension of the subsidiary automated assistant. This can allow any client-side applications to tunnel or channel particular intents and/or actions to and/or from the automobile automated assistant. Furthermore, such tunneling can provide a system architecture that supports an ability of the user to engage with their respective client-side applications, without necessarily employing or installing any correlated "automobile-side" applications at the automobile computer system. In this way, a more efficient use of automobile-side memory can be effectuated through not necessarily requiring such correlated, third-party applications to be installed on every automobile-side device. Furthermore, network traffic and wasteful power consumption would be mitigated as a result of the user merely relying on their automated assistants to communicate with at least a single instance of an application, rather than employing multiple instances of multiple applications to synchronously operate. In particular, a reduction in network and computational resources can be exhibited by messaging servers and applications that would otherwise send duplicative copies of messages and confirmation receipts to a variety of different devices.

For instance, in some implementations, an automobile automated assistant of a vehicle can be employed to communicate a message received at a third-party application of a client device, such as a mobile phone, and respond to the message according to an interaction between a user and the automobile automated assistant. In order to achieve such functionality, the client device and an automobile computer system of the automobile can perform a handshake, in order to establish a secure communication channel between the client device and the automobile computer system. Specifically, the client device can assign one or more network sockets (e.g., a Bluetooth socket(s)) as nodes for transmitting data to and/or from the automobile computer system. When a secure communication channel has been established between the client device and the automobile computer system, action intents can be shared between the client automated assistant and the automobile automated assistant.

An action intent can refer to a request from an application, for a particular action to be performed via the application or a separate application. For instance, an action intent request can be generated by a third-party application and identify one or more of an action to be performed, a custom identifier, content data that is associated with the action to be performed, and/or any other data that can be associated with an action to be performed by an application. The action intent can be initially received by an operating system, device application, automated assistant, and/or any other engine or module available of the device at which the action intent was originated. The action intent can then be cataloged, or otherwise queued, at the originating device, and made accessible to one or more instances of the automated assistant. For example, a client automated assistant of the originating client device can access the pending action intent, and, when the client device is paired with an automobile computer system, an automobile automated assistant can access the pending action intent.

In furtherance of the aforementioned example, the automobile automated assistant can communicate with the client automated assistant to identify a pending action intent request. The action intent request can be associated with a message that was received at a third-party application of the client device while the user was riding in the automobile. The term "third party" can refer to an entity that created and/or provided the third-party application, and is different than a creator and/or provider of the client device, the client automated assistant, and/or a client operating system. By accessing the action intent request at the client device, the automobile automated assistant can act as an intermediary through which the user can further particular pending action intent requests. Furthermore, the automobile automated assistant can cause a corresponding instance of the action intent request, as well as any other action intent requests that might be pending at the client device, to be generated at the automobile computer system. The corresponding instances of the action intent requests at the automobile computer system can be handled by the automobile automated assistant, despite the automobile computer system being void of the third-party application that originated the message.

The automobile automated assistant can determine that the action intent request is associated with a message based on the content of the action intent request, and, in some implementations, regardless of the third-party application that provided the action intent request. In this way, the automated assistant can manage action intents from a variety of different applications, seemingly agnostic with respect to the applications that are originating the action intents. For instance, a first service provider of a first application and a second service provider of a second application can each provide messages in different manners, however, the respective messages will have a "body" and a "sender" field regardless. The overlap in the structure of messages, which, in some implementations can be in part due to a respective application satisfying an API, can allow each message to be similarly parsed. An automated assistant can then use any parsed data from a respective message to provide notifications, respond to message, and/or perform any other action that can be associated with a message. In some implementations, similar overlaps can be exhibited by other applications capable of interacting with an automated assistant. Such other applications can include navigation applications, where contents of a notification can include route steps, and/or media applications, where contents of a notification can include an address of particular media data, such as an image and/or a video.

When the automobile automated assistant determines that the corresponding instance of the action intent request is associated with a message, the automobile automated assistant can cause the contents of the corresponding instance to be parsed. The parsed contents can be used to identify separate portions of the message, such as the body, the author, the subject, a sent and/or received time, and/or any other data that can be associated with a message. Because the automobile automated assistant has determined that the action intent request corresponds to a message, the automobile automated assistant can use the parsed contents in order to present the parsed contents to the user. For instance, the automobile automated assistant can employ a text-to-speech engine for converting at least a portion of the content of the action intent request into audio that can be output from an automated assistant interface, such as an audio system, of the automobile computer system. The audio can be, for example, "You received a text message from 'Emily,' which she says, 'I will be running late.'" The author "Emily" and the body "I will be running late" can be based on data that was parsed from the corresponding instance of the action intent request.

In response to notifying the user of the message received at their client device, the automobile automated assistant can follow up with a prompt, which can present the user with the option to reply to the message. The prompt can include responsive audio such as, "Would you like to reply to 'Emily'?" and, in response, the user can provide a spoken utterance such as, for example, "Yes, please respond, 'Okay.'" Accordingly, the automobile automated assistant can receive the spoken utterance, via the automated assistant interface of the automobile, and employ a speech-to-text engine accessible to the automobile computer system to process the spoken utterance. The text derived from the spoken utterance can be embodied as content that can be part of a subsequent action intent request that is generated by the automobile automated assistant. The subsequent action intent request can be further generated to identify an action, such as sending a message, which should be performed by a target application (e.g., the third-party application).

In order to synchronize the subsequent action intent with the action intent request generated by the client device, the automobile automated assistant can generate the subsequent action intent using the same custom identifier as the action intent request generated by the client device. In this way, the client device can access the subsequent action intent request and/or determine that the subsequent action intent request was generated at the automobile computer system, and determine a correlation between the subsequent action intent request and the action intent request. In some implementations, the custom identifier can be used as at least one key for encrypting transmissions between the automated assistants.

When the subsequent action intent request has been generated at the automobile computer system, the client automated assistant can determine that the subsequent action intent request was generated, and generate a corresponding instance of the subsequent action intent request at the client device. Because the subsequent action intent request is directed at sending a message via the third-party application, the client automated assistant and/or client device can invoke the third-party application to send the message. In other words, because automobile computer system does not include an instance of the third-party application, the generation of the subsequent action intent request does not directly invoke any instance of the third-party application installed at the automobile computer system. Rather, in response to the client automated assistant acknowledging the generation of the subsequent action intent request and/or the corresponding instance of the subsequent action intent request being generated at the client device, the third-party application performs the sending of the responsive message.

In some implementations, in response to the user acknowledging the receipt of the message and/or in response the user indicating they would like to respond to the message, a pendency of the action intent request at the client device and the automobile computer system can be dismissed. For instance, in response to the user providing the spoken utterance, "Yes, please respond, 'Okay,'" the automobile automated assistant can cause a corresponding instance of the action intent request to be dismissed at the automobile computer system. Additionally, in response to the user providing the aforementioned spoken utterance, the client automated assistant can cause the action intent request to be dismissed at the client device. If a separate corresponding instance of the action intent request associated with the originally received message is available at, for example, a remote server device, the separate corresponding instance can also be dismissed.

The above description is provided as an overview of some implementations of the present disclosure. Further description of those implementations, and other implementations, are described in more detail below.

In some implementations, a method implemented by one or more processors is set forth as including operations such as identifying, by an automobile automated assistant, a first action intent request that is generated at a client device. The client device can be paired with an automobile computer system via a wireless communication channel, wherein the automobile computer system includes the automobile automated assistant. The operations can also include determining, in response to identifying the first action intent request, that the first action intent request identifies: a first requested action to be performed, content data to be accessed for performing the requested action, and an identifier that is associated with an application that at least partially caused the first action intent request to be available to the automobile computer system. The operations can also include causing, in furtherance of the first requested action to be performed, an automated assistant interface accessible to the automobile computer system to provide an output to a user of the automobile computer system, wherein the output is based on the content data of the first action intent request. The operations can further include determining, by the automobile automated assistant, that the user provided an input in response to the output provided at the automated assistant interface; and providing, in response to determining that the user provided the input, a second action intent request to the client device. The second action intent request can identify: a second requested action to be performed at the client device, other content data that is based on the input provided by the user, and the identifier. The operations can also include causing the second requested action to be performed at the client device according to the second action intent request. The second requested action can be performed by the application using the other content data, and the application can be identified by the client device using the identifier provided in the second action intent request.

In some implementations, the method can include providing, in response to determining that the user provided the input, a third action intent request to the client device, the third action intent request identifying the identifier and a third requested action, wherein, in response to the client device receiving the third action intent request, the third action intent request causes a pendency of the second action intent request at the client device to be dismissed. In some implementations, the method can include causing, in response to determining that the user provided the input, a dismissal of a separate pendency of a corresponding instance of the second action intent request, wherein the corresponding instance of the second action intent request is provided at the automobile computer system. In some implementations, the pendency of the second action intent request is indicated by a first automated assistant event handler accessible via the client device, and the separate pendency of the corresponding instance of the second action intent request is indicated by a second automated assistant event handler accessible via the automobile computer system.

In some implementations, the automobile computer system is void of an installed application that: (i) is provided by a third party who provided the application at the client device, and (ii) is at least partially correlated to the application at the client device. In some implementations, the automobile computer system is paired with a separate client device that includes another application that is provided by a different third party relative to the application at the client device, and the method further comprises: identifying, by the automobile automated assistant, a separate action intent request that is generated at the separate client device, the separate client device being paired with the automobile computer system. In some implementations, the separate action intent request includes another identifier generated by the separate client device, and the method further comprises: designating, based on a difference between the identifier and the other identifier, the first action intent request as a priority over the separate action intent request.

In other implementations, a method implemented by one or more processors is set forth as including operations such as connecting, using an automobile computer system, with a first client device via a wireless communication modality, the first client device comprising a client automated assistant, and the automobile computer system comprising an automobile automated assistant and an automobile sensor application, the automobile sensor application configured to monitor at least one sensor of the automobile computer system. The method can also include connecting, using an automobile computer system, with a second client device via the wireless communication modality, the second client device comprising another client automated assistant. The method can further include determining, by the automobile computer system, that a first action intent request was generated at the first client device by an application, wherein the application corresponds to a particular category of service and is provided by a first service provider. The method can also include determining, by the automobile computer system, that a second action intent request was generated at the second client device by another application, wherein the other application corresponds to the particular category of service and is provided by a second service provider. The method can further include determining, using the automobile computer system, that a third action intent request was generated at the automobile sensor application, wherein the third action intent request is generated based on sensor data from the sensor of the automobile computer system. The method can also include generating, by the automobile automated assistant, data indicating a pendency of each action intent request of the first action intent request, the second action intent request, and the third action intent request, wherein the data is stored at the automobile computer system. The method can further include causing, according to the generated data, one or more interfaces connected to the automobile computer system to provide a notification for each action intent request of the first action intent request, the second action intent request, and the third action intent request.

In some implementations, the method can include causing, in response to determining that the third action intent request was generated at the automobile sensor application, a corresponding instance of the third action intent request to be stored at the first client device. In some implementations, the method can include receiving a user input at the one or more interfaces connected to the automobile computer system; and causing, in response to receiving the user input, a pendency of the notification associated with the third action intent request to be dismissed at the automobile computer system and the corresponding instance of the third action intent request to be dismissed at the first client device. In some implementations, the particular category of service is a messaging service and the first service provider is different than the second service provider. In some implementations, the method can include processing, for each action intent request of the first action intent request and the second action intent request, content of each message embodied by each action intent request, wherein the processing of the content of each message is performed inattentive of whether each message was provided by a service provider of the first service provider and the second service provider. In some implementations, generating the data indicating the pendency of each action intent request includes: generating, by the automobile automated assistant, a corresponding instance of each action intent request of the first action intent request, the second action intent request, and the third action intent request.

In yet other implementations, a method implemented by one or more processors is set forth as including operations such as connecting, by a client device via a wireless modality, with an automobile computer system that is integral to a vehicle and includes an automobile automated assistant, wherein the client device includes a client automated assistant. The method can also include accessing, by the client device via the automobile computer system, an action intent request that was received by the automobile automated assistant from an application of the automobile computer system, wherein the application is in communication with a sensor of the vehicle and the action intent request is based at least on a signal from the sensor. The method can further include generating, by the client automated assistant and based on accessing the action intent request, a corresponding instance of the action intent request, wherein the client device includes one or more other action intent requests provided by one or more other applications at the client device. The method can also include disconnecting the client device from the automobile computer system, at least based on the client device becoming less proximate to the vehicle or the automobile computer system. The method can further include performing, by the client automated assistant subsequent to disconnecting from the automobile computer system, an action according to the corresponding instance of the action intent request, wherein performing the action includes providing, at an interface of the client device, content identified by the action intent request.

In some implementations, the client device is void of an installed application that: (i) is provided by a third party who provided the application at the automobile computer system, and (ii) is at least partially correlated to the application at the automobile computer system. In some implementations, determining a particular context, and performing is in response to determining the particular context. In some implementations, determining the particular context includes determining a location of the client device, and the method further comprises: determining that the content identified by the action intent request is associated with the location of the client device, wherein the action is performed in response to determining that the content identified by the action intent request is associated with the location of the client device. In some implementations, the method can include providing, based on the client automated assistant performing the action according to the corresponding instance of the action intent request, a request for the action intent request to be dismissed at the automobile computer system. In some implementations, the request is provided to a remote server device that is configured to communicate with the automobile computer system and cause the action intent request to be dismissed at the automobile computer system. In some implementations, the action intent request was generated in response to a user providing a spoken utterance to an automated assistant interface of the automobile computer system, and wherein the method further comprises: receiving, from the automobile computer system in response to the user providing the spoken utterance to the automated assistant interface, data corresponding to the spoken utterance; and providing, to the automobile computer system, responsive data based on the data received from the automobile computer system, wherein the action intent request is further based on the responsive data received by the automobile computer system.

According to at least one aspect of the disclosure, a system to establish communication channels between networked devices can include an automobile-based data processing system to receive, by an interface of the automobile-based data processing system, a first input audio signal from a client device. The automobile-based data processing system can determine, based on the first input audio signal, a first action intent request and an identifier of an application associated with the first action intent request. The automobile-based data processing system can output, by the interface of the automobile-based data processing system, an output response based on the first action intent request. The automobile-based data processing system can receive, by the interface of the automobile-based data processing system, a second input audio signal, the second input audio signal generated in response to the output response. The automobile-based data processing system can determine, by the automobile-based data processing system, content data and a second action intent request based on the second input audio signal. The second action intent request can include the identifier of the application associated with the first action. The automobile-based data processing system can transmit, by the automobile-based data processing system, the second action intent request and the content data to a client device to process the second action intent request with the application identified by the identifier of the second action intent request.

According to at least one aspect of the disclosure, a method to establish communication channels between networked devices. The method can include receiving, by an interface of the automobile-based data processing system, a first input audio signal from a client device. The method can include determining, by the automobile-based data processing system and based on the first input audio signal, a first action intent request and an identifier of an application associated with the first action intent request. The method can include outputting, by the interface of the automobile-based data processing system, an output response based on the first action intent request. The method can include receiving, by the interface of the automobile-based data processing system, a second input audio signal. The second input audio signal generated in response to the output response. The method can include determining, by the automobile-based data processing system, content data and a second action intent request based on the second input audio signal, the second action intent request comprising the identifier of the application associated with the first action. The method can include transmitting, by the automobile-based data processing system, the second action intent request and the content data to a client device to process the second action intent request with the application identified by the identifier of the second action intent request.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
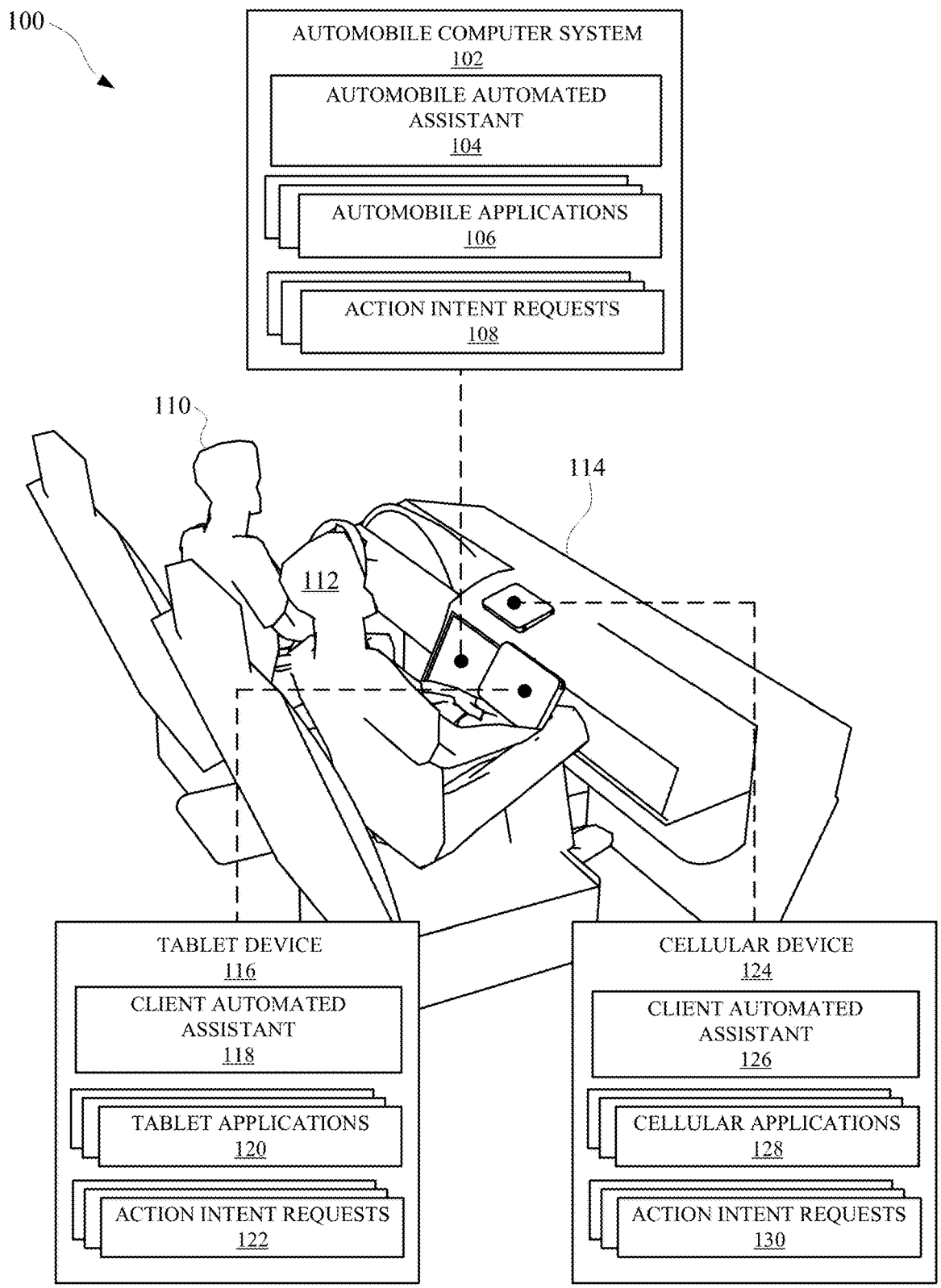
FIG. 1 illustrates a perspective view of a vehicle that can allow multiple different users to cause a vehicle automated assistant to interact with applications at each of their respective devices.

FIG. 1 illustrates a perspective view 100 of a vehicle 114 that can allow multiple different users to cause a vehicle automated assistant to interact with applications at each of their respective devices. When riding in a vehicle 114, a first user 110 and a second user 112 may bring different devices to interact with during their excursion in the vehicle 114. For instance, the first user 110 can bring a cellular device 124 (i.e., a client device) and the second user 112 can bring a tablet device 116 (i.e., a client device). The vehicle 114 can include an automobile computer system 102, which can provide the users with access to an automobile automated assistant 104. Each of the cellular device 124 and the tablet device 116 can include a client automated assistant 126 and a client automated assistant 118, respectively. Furthermore, the automobile automated assistant 104 can act as a primary automated assistant when each of the users bring their respective devices into the vehicle 114. In this way, each user does not necessarily have to pair their respective device exclusively to the automobile computer system 102. Furthermore, according to some implementations of the automobile automated assistant 104, the automobile computer system 102 does not necessarily need to have the same applications that are installed on each of the client devices. In this way, the automobile computer system 102 can make a more efficient use of memory, and, furthermore, with fewer installed applications, the automobile computer system 102 would not consume as much network bandwidth retrieving updates and communicating with servers. Such benefits can be realized, in part, through interactions between each respective automated assistant over a wireless communication modality available at the vehicle 114. Furthermore, similar benefits can be realized at servers that would otherwise use phone numbers for authenticating and delivering each message.

For example, each user can enter the vehicle 114 with their respective client devices, and each client device can include and/or generate action intent requests. For instance, the tablet device 116 can include one or more tablet applications 120, capable of generating action intent requests 122, and the cellular device 124 can include one or more cellular applications 128 capable of generating action intent requests 130. The tablet applications 120 and/or the cellular applications 128 can be third-party applications and/or applications that are provided or developed by an entity that is different than an entity that provided or developed one or more instances of the automated assistant.

When the first user 110 and the second user 112 initially enter their vehicle 114 with their respective client devices, each client device can determine that the vehicle 114 includes an automobile computer system 102 capable of communicating over a wireless modality. Furthermore, each client device can determine that the automobile computer system 102 includes an automobile automated assistant 104. Specifically, the client automated assistant 118 and the client automated assistant 126 can determine that the automobile computer system 102 includes the automobile automated assistant 104. In response to making the determination, the client automated assistant 118 can cause corresponding instances of the action intent requests 122 to be generated at the automobile computer system 102, and the client automated assistant 126 can cause corresponding instances of the action intent requests 122, 130 to be generated at the automobile computer system 102. As a result, the automobile automated assistant 104 can cause any actions associated with the corresponding instances of the action intent requests (stored locally as action intent requests 108) to be furthered via interactions between one or more users and the automobile automated assistant 104. Moreover, the automobile automated assistant 104 can further the actions identified by the action intent requests 108 despite the automobile computer system 102 including automobile applications 106, which may not be equivalent to, or otherwise be an instance of, any one application of the tablet applications 120 and/or the cellular applications 128. For instance, the automobile applications 106 can include a maintenance application that provides the automobile automated assistant 104 with information about the vehicle 114. The information can be shared with one or more both of the tablet device 116 and cellular device 124, despite either device not including an equivalent, or instance of, the maintenance application. This can allow each user to not necessarily direct their attention to their devices during their excursion, but, rather, rely on the automobile automated assistant 104 to relay their respective notifications and/or further any particular action.

Figure 2:
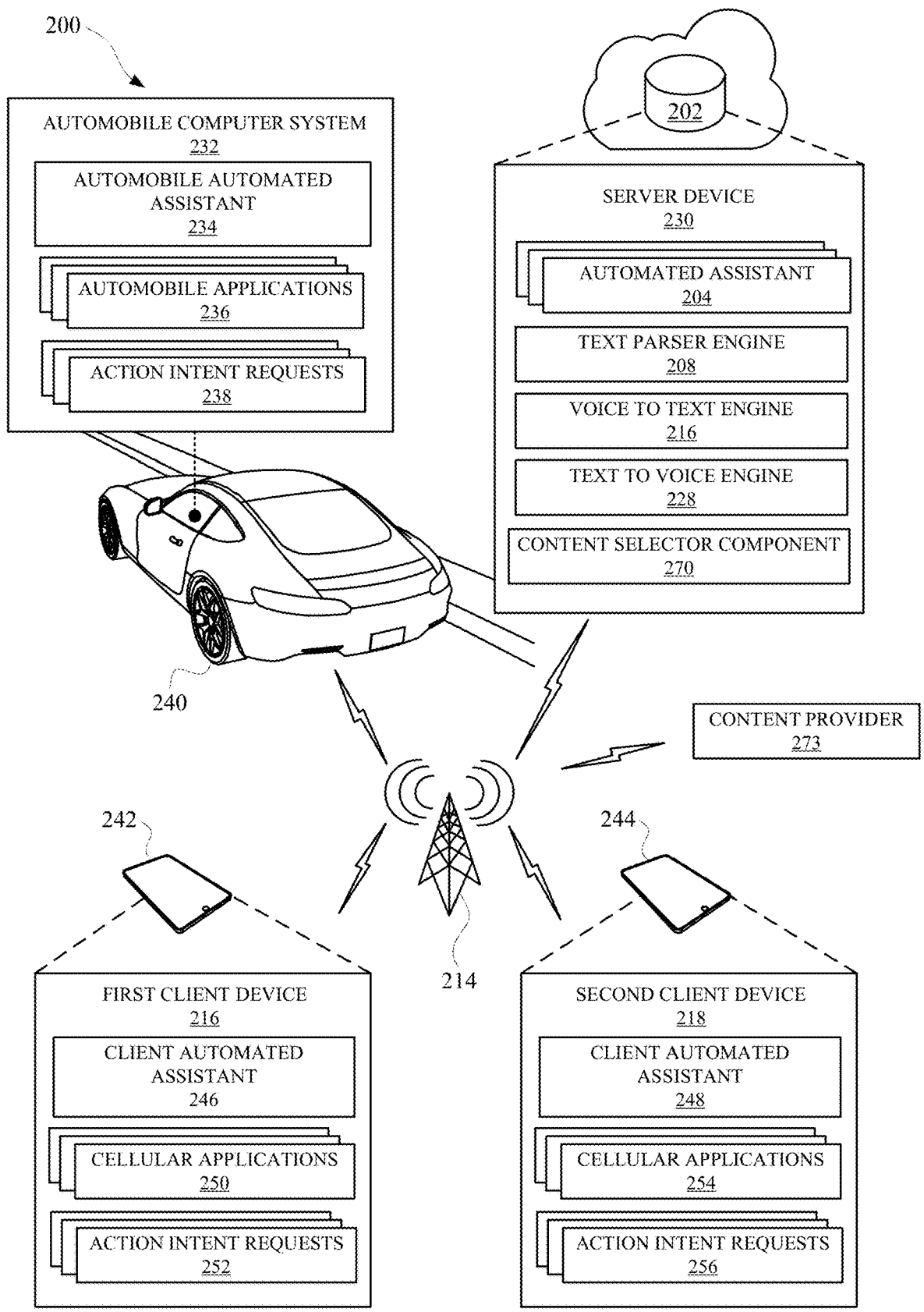
FIG. 2 illustrates a system for providing an automated assistant that is capable of interacting with other automated assistants in order to further actions requested by third party applications.

FIG. 2 illustrates a system 200 for providing an automated assistant that is capable of interacting with other automated assistants in order to further actions requested by third party applications. An automated assistant 204 can operate as part of an assistant application that is provided at one or more computing devices, such as a first client device 216 (e.g., a cellular phone 242), a second client device 218 (e.g., a tablet device 244), and/or a remote computing device 202 (which can be referred to as a remote data processing system), such as a server device 230. A user can interact with the automated assistant(s) 204 via an assistant interface (e.g., inside a vehicle 240), which can be a microphone, a camera, a touch screen display, a user interface, and/or any other apparatus capable of providing an interface between a user and an application. For instance, a user can initialize the automated assistant 204 by providing a verbal, textual, and/or a graphical input to the assistant interface to cause the automated assistant 204 to perform a function (e.g., provide data, control a peripheral device, access an agent, etc.). The first client device 216 can include a display device, which can be a display panel that includes a touch interface for receiving touch inputs and/or gestures for allowing a user to cellular applications 250 of the first client device 216 via the touch interface. The second client device 218 can also include a display device, which can be a display panel that includes a touch interface for receiving touch inputs and/or gestures for allowing a user to control cellular applications 254 of the second client device 218 via the touch interface. In some implementations, the second client device 218 can lack a display device, thereby providing an audible user interface output, without providing a graphical user interface output. Furthermore, the second client device 218 can provide a user interface, such as a microphone, for receiving spoken natural language inputs from a user.

The first client device 216 and the second client device 218 can be in communication with the remote computing device 202 over a network 214, such as the internet. The first client device 216 and the second client device 218 can offload computational tasks to the remote computing device 202 in order to conserve computational resources at each of the first client device 216 and the second client device 218. For instance, the remote computing device 202 can host the automated assistant 204, and the first client device 216 and/or the second client device 218 can transmit inputs received at one or more assistant interfaces to the remote computing device 202. However, in some implementations, the automated assistant 204 can be hosted at the first client device 216 and/or the second client device 218. In various implementations, all or less than all aspects of the automated assistant 204 can be implemented on the first client device 216 and/or the second client device 218. In some of those implementations, aspects of the automated assistant 204 are implemented via a local assistant application of the first client device 216 or the second client device 218 and interface with the remote computing device 202 that implements other aspects of the automated assistant 204. The remote computing device 202 can optionally serve a plurality of users and their associated assistant applications via multiple threads. In some implementations where all or less than all aspects of the automated assistant 204 are implemented via a client automated assistant 226 of the first client device 216 or a client automated assistant 226 of the second client device 218, the client automated assistant can be an application that is separate from an operating system of the first client device 216 and/or the second client device 218 (e.g., installed "on top" of the operating system)—or can alternatively be implemented directly by the operating system of the first client device 216 or the second client device 218 (e.g., considered an application of, but integral with, the operating system).

In some implementations, the remote computing device 202 can include a voice to text engine 216 that can process audio data received at an assistant interface to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can parsed by a text parser engine 208 and made available to the automated assistant 204 as textual data that can be used to generate and/or identify command phrases from the user and/or a third party application.

In some implementations, the remote computing device 202 can include a text to voice engine 228 for converting textual data into audio data. For instance, in response to the automobile automated assistant 234 identifying a pending action intent request 238 associated with a received message, the automobile automated assistant 234 can cause content corresponding to the message to be transmitted to the text to voice engine 228. In response to receiving the content, the text to voice engine 228 can convert the content into audio data, which can be transmitted back to the automobile automated assistant 234. The automobile automated assistant 234 can then cause the audio data to be output as an audio output from an audio interface (e.g., speaker(s)). Text can be converted to audio using a neural network(s), statistical model(s), and/or any other apparatus or module through which textual data can be converted to audio (e.g., audio corresponding natural language output). In some implementations, each of the voice to text engine 216, the text to voice engine 228, and/or the text parser engine 208 can be located at one or more client-side devices, such as the automobile computer system 232, the first client device 216, and/or the second client device 218. In this way, a respective automated assistant would not necessarily have to transmit data to a remote server for processing, but could rather process the data locally in order to generate and/or interpret particular data for a user. The server device 230 can include an instance of the content selector component 270.

In some implementations, one or more of the engines, applications, and/or operations of the server device 230 can be provided and/or executed at the automobile computer system 232, the first client device 216, and/or the second client device 218. For instance, in some implementations, the automobile computer system 232 can include the text to voice engine 228 and/or the voice to text engine 216. Furthermore, in some implementations, any content received at the automobile automated assistant 234, the client automated assistant 246, and/or the client automated assistant 248 can be transmitted to the server device 230 when there is a connection between a device that hosts the respective assistant and the server device 230. Alternatively, or additionally, when no connection is available between a respective device or system, and the server device 230, any content received can be exclusively processed at the respective device and/or shared with other local device in order that the content can be processed in parallel. For instance, when the content corresponds to a message received at the second client device 218 and transmitted to the automobile computer system 232, the automobile computer system 232 can employ a local text to voice engine in order to generate audio that can be provided to a user while riding in the vehicle.

The server device 230 can include a content selector component 270. The client devices (e.g., client device 216 and client device 218) and the automobile computer system 232 can include an instance of the content selector component 270 that can perform the same functions as the content selector component 270 of the server device 230. The content selector component 270 can select content items based on interests associated with the client devices or automobile computer system 232. The content items can be referred to as content data or digital components. The content selector component 270 can select content items based on keywords that the associates with the action intent request for which the content item is being selected. For example, the action intent request can be a notification to replace the automobile's brake pads. The content selector component 270 can identify keywords such as "replace brake pads," "new brake pads," or "service garage." The content selector component 270 can receive the request from one of the client devices or the automobile computer system 232, where the request can be stored as part of the content data. The indication of the action data structure can inform the content selector component 270 of related action intent requests. For example, the action data structure can be an action intent request that can include an identification of another action intent request. For example, the action data structure can include an indication of another action intent request such as a notification that the brakes are wearing out. The content selector component 270 can select a content item based on the notification that the breaks are wearing out. For example, the content selector component 270 can select a content item that indicates a garage that can replace the brakes on the car.

The content selector component 270 can receive a content request or an indication thereof as a component of an action intent request. The content selector component 270 can select the content item based on previously received audio inputs (or packaged data object) or user preferences. The content selector component 270 can execute a real-time digital component selection process to select the digital component. The content selector component 270 can select addition or supplemental digital components based on the input request.

The real-time digital component selection process can refer to, or include, selecting digital component objects (which may include sponsored digital component objects) provided by third party content providers 273. The real-time content selection process can include a service in which digital components provided by multiple content providers are parsed, processed, weighted, or matched based on request identified in the input audio signal in order to select one or more digital components to provide to the automobile computer system 232 (which can be referred to as an automobile-based data processing system) or client devices. The content selector component 270 can perform the content selection process in real-time. Performing the content selection process in real-time can refer to performing the content selection process responsive to the request for content received via the client computing device 118. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session or within a time interval after the communication session is terminated.

For example, the content selector component 270 can be designed, constructed, configured, or operational to select digital component objects based on the content request in the input audio signal or action intent request. The content selector component 270 can identify, analyze, or recognize voice, audio, terms, characters, text, symbols, or images of the candidate digital components using an image processing technique, character recognition technique, natural language processing technique, or database lookup when selecting the content items. The candidate digital components can include metadata indicative of the subject matter of the candidate digital components, in which case content selector component 270 can process the metadata to determine whether the subject matter of the candidate digital component corresponds to the content of the action intent request.

The content selector component 270 can identify, select, or obtain multiple content items resulting from a multiple content selection processes. The content selector 270 can select multiple content items that the content selector component 270 can cache at one or more of the selected content items at the automobile computer system 232 or client devices. For example, the content selector component 270 can locally cache the content items at the automobile computer system 232 when the automobile has a network connection to a remote content provider device such that when the automobile computer system 232 does not have a network connection, the content selector component 270 can retrieve a content item from the local cache rather than the remote content provider.

Responsive to the request identified in the input audio (or other) signal, the content selector component 270 can select a digital component object from a database associated with the content provider 273 and provide the digital component for presentation at the automobile computer system 232 or client devices. The digital component object can be provided by a content provider 273. The content selector component 270 can select multiple digital components. The multiple digital components can be provided by different content providers 273. For example, a first content provider 273 can provide a primary digital component responsive to the request and a second content provider 273 can provide a supplemental digital component that is associated with or relates to the primary digital component. The automobile computer system 232 or a user thereof can interact with the digital component object. The automobile computer system 232 and the client devices can receive an audio, touch, or other input response to the digital component. The automobile computer system 232 or the client computing devices can receive an indication to select a hyperlink or other button associated with the digital component object that causes or allows the automobile computer system 232 or the client devices to identify content provider 273, request a service from the content provider 273, instruct the content provider 273 to perform a service, transmit information to the content provider 273, or otherwise identify a good or service associated with content provider 273.

The content selector component 270 can select a digital component that includes text, strings, or characters that can be processed by a text to speech system or presentable via a display. The content selector component 270 can select a digital component that is in a parameterized format configured for a parametrically driven text to speech technique. The content selector component 270 can select a digital component that is in a format configured for display via the automobile computer system 232 or the client devices. The content selector component 270 can select a digital component that can be re-formatted to match a native output format of the automobile computer system 232 or the client devices or application to which the digital component is transmitted.

The content selector component 270 can provide the selected digital component to the automobile computer system 232 or the client devices for presentation by the automobile computer system 232 or the client devices.

The system can include one or more content providers 273. The content providers 273 can provide audio, visual, or multimedia based digital components (which can also be referred to as content, content items, images, or supplemental content) for presentation by the automobile computer system 232 or the client devices as an audio and visual based output digital components. The digital component can be or include other digital components. The digital component can be or include a digital object. The digital components can be included or associated with action intent requests. The digital component can be configured for a parametrically driven text to speech technique. The digital component can be configured for text-to-speech (TTS) implementations that convert normal language text into speech. For example, the digital component can include an image that is displayed to the user and, via TTS, text related to the displayed image is presented to the user. The digital component can be input to an application programming interface that utilizes a speech-synthesis capability to synthesize text into natural sounding speech in a variety of languages, accents, and voices. The digital component can be coded as plain text or a speech synthesis markup language (SSML). SSML can include parameters that can be set to control aspects of speech, such as pronunciation, volume, pitch, or rate that can form an acoustic fingerprint or native voice.

The content provider 273 can provide selection criteria for the digital component, such as a value, keyword, concept, or other metadata or information to facilitate a content selection process. The content provider 273 can provide video based digital components (or other digital components) to the content selector component 270 where they can be stored in a data repository. The content selector component 270 can select the digital components from the data repository and provide the selected digital components to the client computing device 118.

The content provider 273 can provide the digital component to the content selector component 270 for storage in the data repository in a content data structure. The content selector component 270 can retrieve the digital component responsive to a request for content from the client computing device 118 or otherwise determining to provide the digital component. As described herein, the content selector component 270 can cache one or more digital components at the automobile computer system 232 or the client devices.

The content provider 273 can establish a digital component campaign (or electronic content campaign). A digital component campaign can refer to one or more content groups that correspond to a common theme. A content campaign can include a hierarchical data structure that includes content groups, digital component data objects (e.g., digital components or digital objects), and content selection criteria. To create a digital component campaign, content provider 273 can specify values for campaign level parameters of the digital component campaign. The campaign level parameters can include, for example, a campaign name, a preferred content network for placing digital component objects, a value of resources to be used for the digital component campaign, start and end dates for the content campaign, a duration for the digital component campaign, a schedule for digital component object placements, language, geographical locations, type of computing devices on which to provide digital component objects. In some cases, an impression can refer to when a digital component object is fetched from its source and is countable. Due to the possibility of click fraud, robotic activity can be filtered and excluded, as an impression. Thus, an impression can refer to a measurement of responses from a Web server to a page request from a browser, which is filtered from robotic activity and error codes, and is recorded at a point as close as possible to opportunity to render the digital component object for display on the computing device 104. In some cases, an impression can refer to a viewable or audible impression; e.g., the digital component object or digital component is at least partially (e.g., 20%, 30%, 30%, 40%, 50%, 60%, 70%, or more) viewable on a display device of the automobile computer system 232 or the client devices or audible via a speaker of the automobile computer system 232 or the client devices. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider 273 can establish one or more content groups for a digital component campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for content group level parameters, such as keywords, negative keywords (e.g., that block placement of the digital component in the presence of the negative keyword on main content), or parameters associated with the content campaign.

To create a new content group, the content provider 273 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 273 can use to capture a topic or subject matter for which digital component objects of the content group is to be selected for display. For example, a car company can create a different content group for each model of car the company sells and may further create a different content group for each configuration of the car model the company carries.

The content provider 273 can provide one or more keywords and digital component objects to each content group. The keywords can include terms that are relevant to the product or services of associated with or identified by the digital component objects. A keyword can include one or more terms or phrases. For example, the food and beverage company can include "soda," "cola," "soft drink," as keywords for a content group or content campaign that can be descriptive of the goods or services the brand provides. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider 273 can provide the one or more keywords to be used by the content selector component 270 to select a digital component object provided by the content provider 273. The content provider 273 can provide additional content selection criteria to be used by the content selector component 270 to select digital component objects. The content selector component 270 can run a content selection process involving multiple content providers 273 responsive to receiving an indication of a keyword of an electronic message.

The content provider 273 can provide one or more digital component objects for selection by the content selector component 270. The digital component objects can be a digital component or a collection of digital components. The content selector component 270 can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. Upon selecting a digital component, the content selector component 270 can transmit the digital component object for presentation or rendering on the automobile computer system 232 or the client devices or display device of the client computing device 118. Presenting or rendering can include displaying the digital component on a display device or playing the digital component via a speaker of the automobile computer system 232 or the client devices. The content selector component 270 to present or render the digital component object. The content selector component 270 can instruct the automobile computer system 232 or the client devices to generate audio signals, acoustic waves, or visual output. For example, the automated assistant client 108 can present the selected digital component via an audio output.

In some implementations, each device or system that include one or more applications can also include one or more corresponding action intent generation engines. An action intent generation engine can be controlled by an application in order to cause certain actions to be performed by the application, another application, and/or any other module accessible to the application. For instance, the application can be a messaging application and the messaging application can receive an incoming message. In response to receiving the incoming message, the action intent generation engine of the messaging application can generate an action intent for providing a notification to the user via an automated assistant. The action intent can identify the action to be performed (e.g., providing a notification), content of the received message, a custom identifier associated with the message, and/or any other data that can be associated with the message.

In some implementations, each action intent generation engine and/or application can be associated with a declaration and/or manifest file indicating types of actions capable of being performed by the application. For instance, a messaging application can include a manifest file indicating that the messaging application is capable of at least receiving messages, notifying the user of messages, and/or responding to messages. An operating system and/or an automated assistant can access each manifest file on one or more devices in order to determine whether particular applications can handle particular actions. In this way, for example, action intents generated at the automobile computer system 232 can be provided to either the first client device 216 or the second client device 218 based on whether a particular manifest file at one of the devices indicates there is an application at the device that can handle the action intents. If more than one application can handle a particular action intent, the originating device and/or a separate device, can prompt the user to select the device to handle the particular action intent (e.g., via a graphical user interface).

In some implementations, each action intent generation engine can also generate and/or filter action intents according to a customer identifier that is associated with each action intent of the action intents. For instance, when an action intent generation engine generates an action intent at the direction of an application, the action intent generation engine can also generate a custom identifier. The custom identifier can be generated based on an identifier for content to be used in performing the action, an identifier representing the originating application, an identifier for the recipient, an identifier for the originating user, an identifier for a context of the action intent, and/or any other information that can be used as a basis from which to generate an identifier.

Each automated assistant and/or operating system can be configured to parse an action intent to identify content data, an intended action to be performed, and/or a custom identifier. In some implementations, the automated assistant can process each action intent seemingly agnostic with respect to the originating application. For instance, despite the first client device 216 and the second client device 218 including different messaging applications, the automobile computer system 232 can retrieve action intent requests from either messaging applications and read the message to the user via an automated assistant interface of the automobile computer system 232. For example, a message application at the first client device 216 can generate an action intent request 252, and when the user enters the vehicle 240, the pending action intent request can be accessed by the automobile automated assistant 234. The automobile automated assistant 234 can then generate a corresponding instance of the pending action intent request. Because the content data provided by the action intent request can include data such as "Hey, have you left yet?," the automobile automated assistant 234 can determine that content data corresponds to an incoming message. Therefore, because many different messaging applications will generate action intents in a similar manner, the automobile automated assistant 234 can act to present and respond to such action intents in a universal manner, and/or relatively agnostic to the entity that provided the corresponding messaging application (e.g., a first service provider, a second service provider, etc.).

In some implementations, computational resources can be preserved by employing a voice to text engine to process audio data corresponding to multiple spoken utterances, rather than performing multiple turns between a speech recognition engine and the automated assistant. For instance, a principal automated assistant can receive a command from a user such as, "Send a message to Robert." In response, the principal automated assistant can have a preconfigured response such as, "Ok, which messaging application would you like to use? Your first application, second application, or your third application?" The user can provide a response, such as "My first application," and then dictate a message such as, "How's your day been?" In some implementations, the automated assistant can confirm the messaging application to use and prompt the user whether they would like to send or change the message (e.g., "Ok, should I send the message or change the message?"). At this time, the user may request that a different messaging application be selected. For instance, the user can reply, "Please send with the second messaging application instead of the first messaging application." In response, the automated assistant can then cause the message to be transmitted by the second messaging application. This can reduce a number of turns between the user and the automated assistant, given that the processing of messages would not need to be tailored for each individual messaging application.

In some implementations, each automated assistant (e.g., the automobile automated assistant 234) can access and/or manage an event handler that includes data corresponding to pending action intent requests. As actions in furtherance of the pending action intent requests are performed, each event handler for each automated assistant can be updated. In some implementations, an event handler can include pending action intent request that correspond to the same event. For instance, multiple different actions can be associated with a received message. Therefore, when a user receives a text message at their first client device 216, a corresponding messaging application can generate multiple action intent requests for handling the received text message. When the first client device 216 pairs with the automobile computer system 232 over a wireless modality, such as, but not limited to Bluetooth, Wi-Fi, LTE, etc., the automobile automated assistant 234 can generate corresponding instances of the multiple action intent requests. The corresponding instances of the multiple action intent requests can be managed by an event handler of the automobile automated assistant 234, and can include some amount of data that associates the corresponding instances of the multiple action intent requests with the text message received at the first client device 216. For example, an action intent request identified by the event handler of the automobile automated assistant 234 can correspond to an action to notify the user of the text message and prompt the user regarding whether they would like to respond. The automobile automated assistant 234 can execute both actions related to the received text message, without having direct local access to the messaging application that is installed at the first client device 216.

Figure 3A:
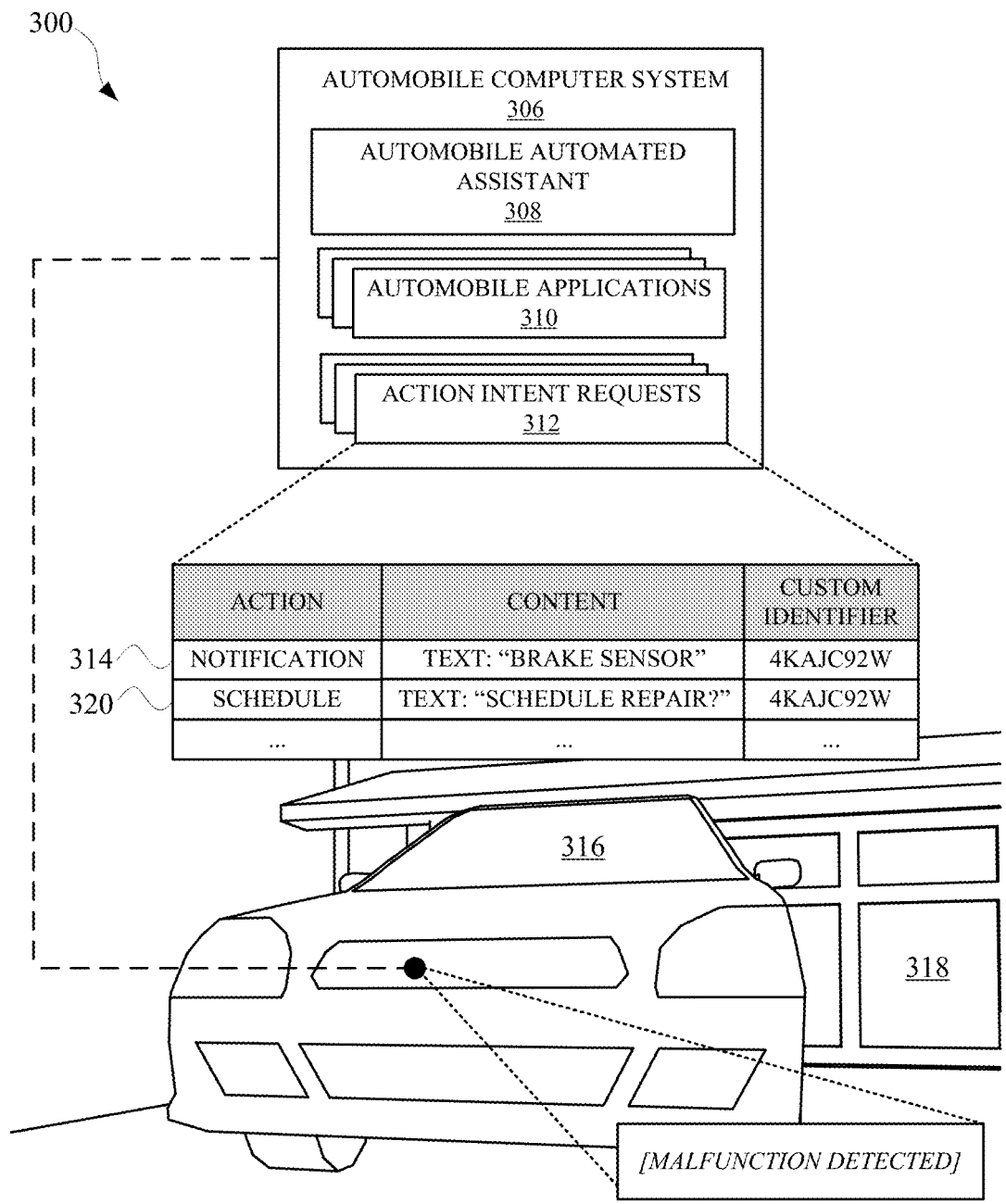
FIGS. 3A, 3B, and 3C illustrate perspective views of a scenario where client automated assistant of a portable computing device can act as a primary or principal automated assistant for multiple instances of the automated assistant.
Figure 3B:
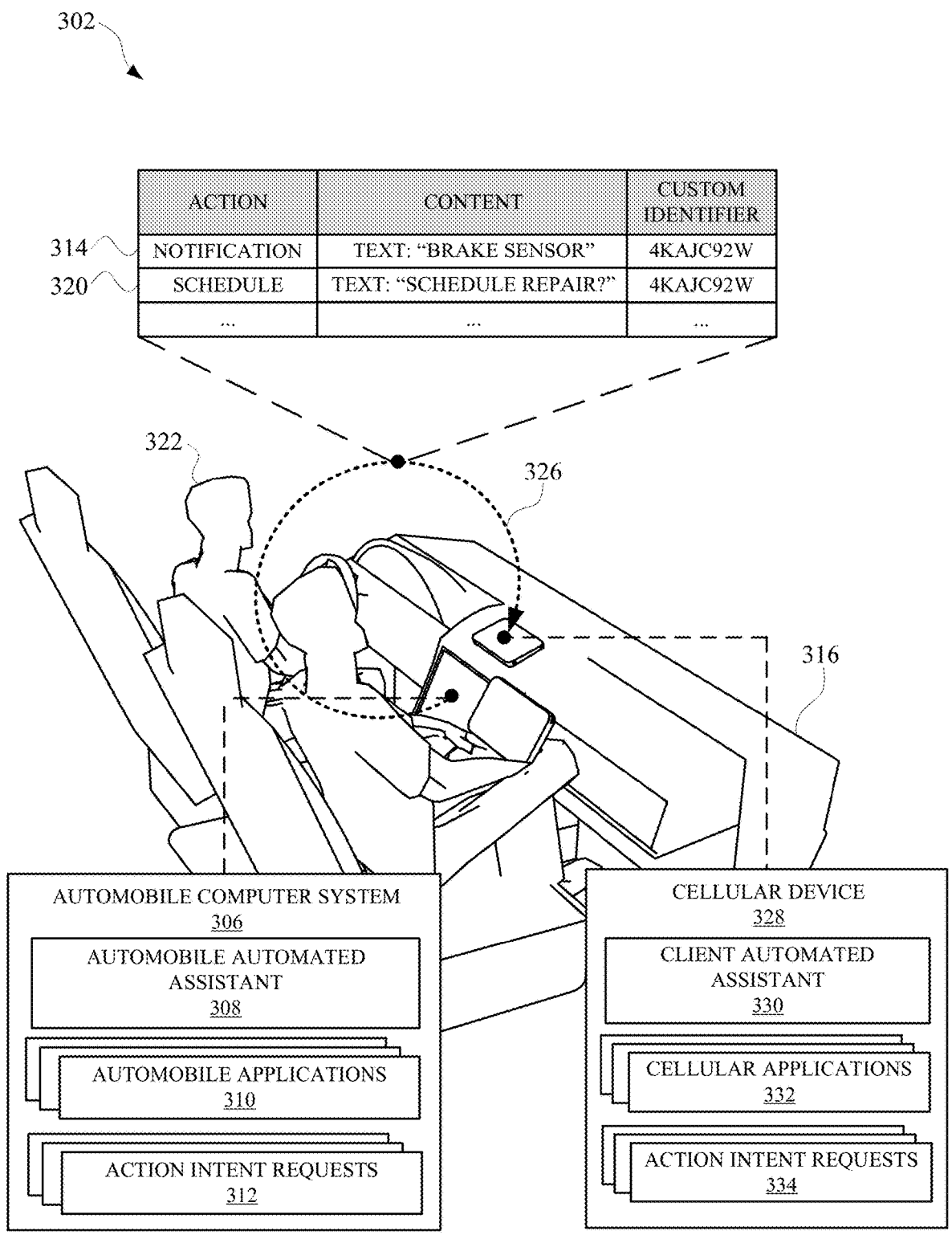
Figure 3C:
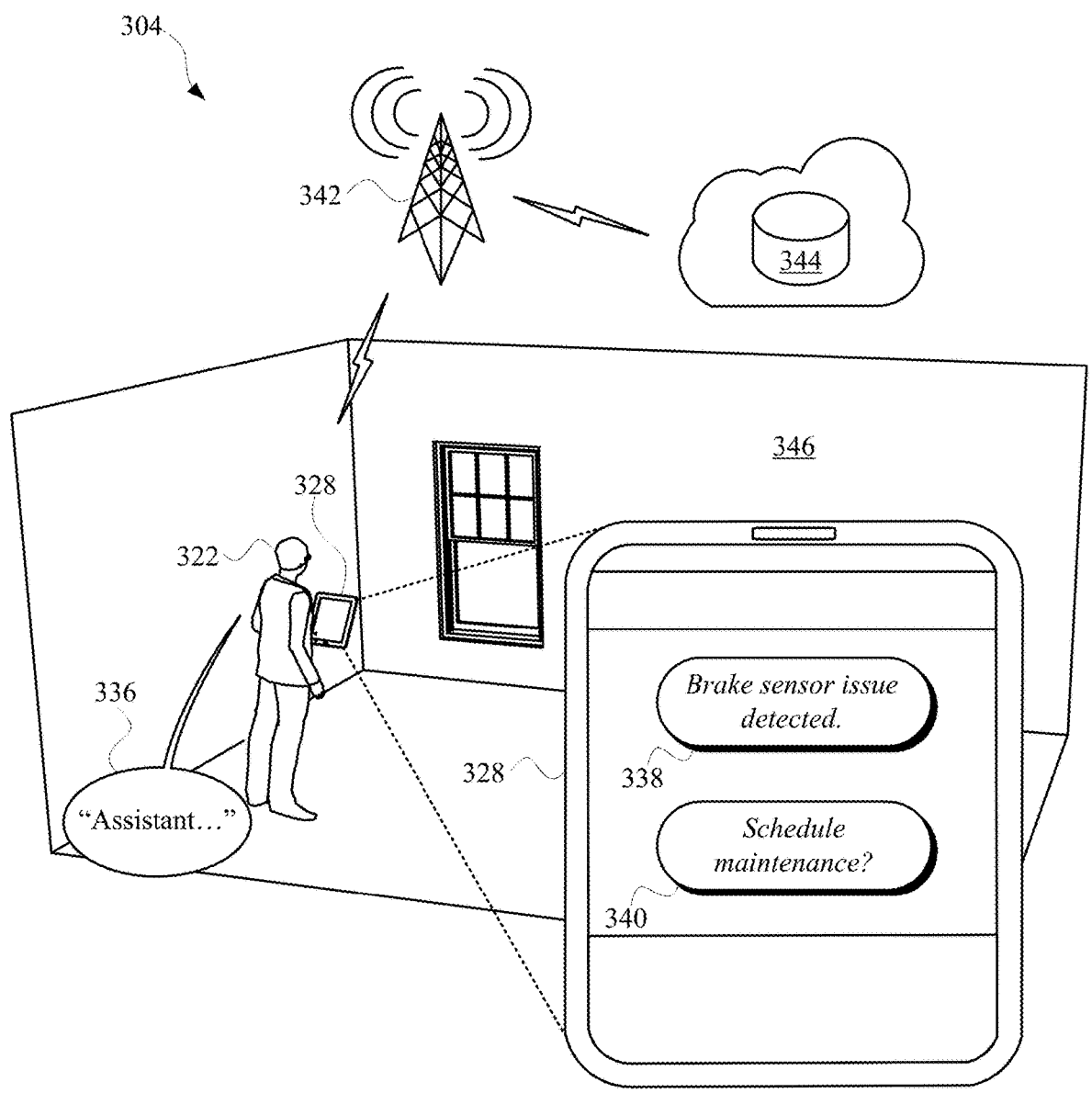

FIGS. 3A, 3B, and 3C illustrate perspective views 300, 302, and 304 of a scenario where client automated assistant of a portable computing device can act as a primary automated assistant for multiple instances of the automated assistant. For instance, while a user is in their home 318, malfunction can be detected at an automobile 316 that is associated with the user. The issue can be, for example, that a rodent has chewed through a cable, such as a wire that connects to a brake sensor, of the automobile 316 at night. Although an automobile computer system 306 of the automobile 316 can be operating in a standby mode, an automobile automated assistant 308 can be responsive to the issue, and generate one or more action intent requests 312 associated with the issue. Specifically, the automobile automated assistant 308 can generate an action intent request 314 for displaying an automobile issue notification (e.g., "brake sensor") to the user, and another action intent request 320 for prompting the user to schedule maintenance (e.g., "schedule repair?") to resolve the issue. Each action intent request can be generated with the same custom identifier (e.g., "4KAJC92W"), which can be associated with the originating issue. Furthermore, each action intent request can identify an action to be performed (e.g., "notification," and "schedule").

FIG. 3B illustrates a perspective view 302 of user 322 that has entered the automobile 316 with their cellular device 328, which also includes an instance of the automated assistant, as the client automated assistant 328. In some implementations, the automobile computer system 306 can include automobile applications 310 that are not installed directly to the cellular device 328. Furthermore, in some implementations, the cellular device 328 can include cellular applications 332 that are not installed directly to the automobile computer system 306. Regardless, action intent requests can be transmitted between the automobile computer system 306 and the cellular device 328 over a wireless modality, and can be parsed by a respective automated assistant.

For instance, the action intent requests 314 and 320 can be generated by a maintenance application of the automobile applications 310 and accessed by the automobile automated assistant 308. When the user 322 enters the vehicle with their cellular device 328, the automobile computer system 306 and the cellular device 328 can perform a handshake, in order to ensure that a secure communications channel 326 is provided between them. When a communications channel 326 has been established, the client automated assistant 330 can identify the pending action intent requests 312 that are available at the automobile computer system 306. Furthermore, the automobile computer system 306 can identify any action intent requests 334 that are available at the cellular device 328. When the client automated assistant 330 determines that the action intent requests 314 and 320 do not have any corresponding instances at the cellular device 328, the client automated assistant 330 can cause instances of the action intent requests 314 and 320 to be available at the cellular device 328. The instances of the action intent requests 314 and 320 at the cellular device 328 can include the same custom identifiers from the automobile computer system 306, thereby allowing updates for a particular event (e.g., an issue with the brake sensor detected) to be compiled over time.

FIG. 3C illustrates a perspective view 304 of the user 322 in their home 346 subsequent to the instance of the action intent requests 314 and 320 being generated. Specifically, the user 322 can enter their home 346 and, in response, the client automated assistant can attempt to complete the actions indicated by the action intent requests 314 and 320. For instance, the client automated assistant can cause a display interface of the cellular device 328 to present selectable elements 338 and 340, which can correspond to the action intent requests 314 and 320. Alternatively, the user 322 can provide a spoken utterance 336 to an interface (e.g., a microphone) of the cellular device 328 in order to cause the client automated assistant to present any notifications associated with any pending action intent requests. For instance, the user 322 can provide a spoken utterance 336 such as, "Assistant, show me pending notifications." In response, the client automated assistant cause a nearby display panel to present notifications associated with the action intent requests to the user 322.

If the user 322 selects either of the selectable elements 338 and 340, a pendency of the action intent requests 314 and 320 can be dismissed at each device that included an instance of the action intent requests 314 and 320. For instance, instances of the action intent requests 314 and 320 can be dismissed at the automobile computer system 306 and the cellular device 328. In some implementations, the action intent requests 314 and 320 can be dismissed at the automobile computer system, when, in response to the user 322 selecting the selectable elements 338 and 340, data can be transmitted over a network 342 to a remote device 344. The remote device 344 can thereafter be accessed by the automobile computer system 306, which can update an event handler of the automobile computer system 306 according to the data at the remote device 344.

Figure 4A:
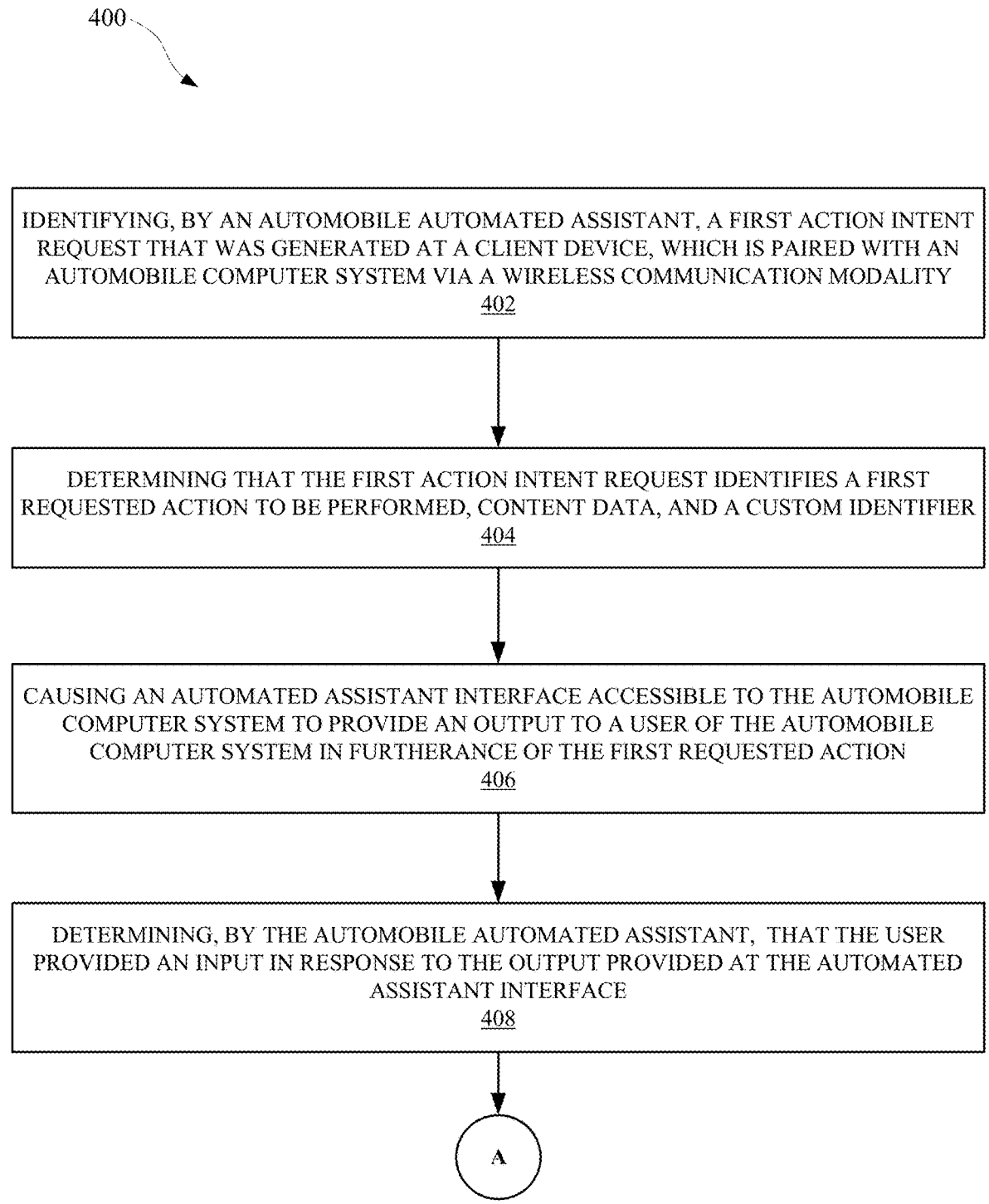
FIGS. 4A and 4B illustrate methods for handling action intent requests generated when a client device is in communication with an automobile computer system.
Figure 4B:
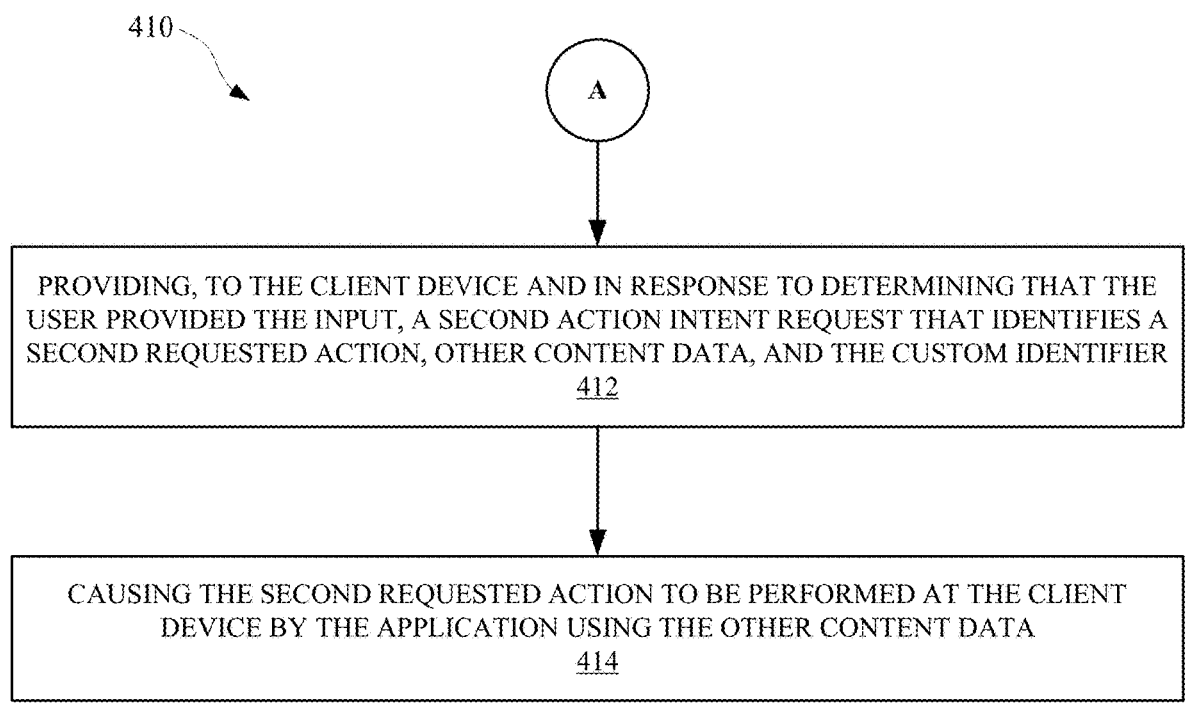

FIGS. 4A and 4B illustrate methods 400 and 410 for handling action intent requests generated when a client device is in communication with an automobile computer system. The methods 400 and 410 can be performed by one or more of a computing device, application, and/or any other apparatus or module capable of communicating over a wireless connection. The method 400 can include an operation 402 of identifying, by an automobile automated assistant, a first action intent request that was generated at a client device. The client device can be paired with an automobile computer system via wireless communication modality. The first action intent request can be generated by an application at the client device, for instance, in response to an operation (e.g., receiving a message) performed at the application. In some implementations, the automobile computer system can be void of a corresponding instance of the application of the client device. Specifically, the automobile computer system can be void of a separate application that is provided by a third party that provided the application at the client device, and/or is at least partially correlated to the application at the client device. For instance, the application can be a text messaging application, and the automobile computer system can be void of the text messaging application.

The method 400 can further include an operation 404 of determining that the first action intent request identifies a first requested action to be performed, content data, and a custom identifier. The first requested action can be a request to notify a user that an incoming message was received at a messaging application installed at the client device. The content data can identify some or all of the text provided in the received text message (e.g., "Are you on the way?"). Furthermore, the custom identifier can be a string of data that can provide a correspondence between the received text message and the first action intent request, in order that any further action taken with the first action intent request can be subsequently associated with the received text message.

The method 400 can also include an operation 406 of causing an automated assistant interface, accessible to the automobile computer system, to provide an output to a user of the automobile computer system. For instance, the output can be provided in response to the automobile automated assistant determining that the first action intent request corresponds to an action of providing a notification. The notification can be presented at the automated assistant interface, which can be a display panel that is connected to the automobile computer system. Alternatively, the automated assistant interface can be a speaker that is connected to the automobile computer system, and the notification can be an audible audio output such as, "Matthew sent you a message that says, 'Are you on the way?'"

The method 400 can further include an operation 408 of determining, by the automobile automated assistant, that the user provided an input in response to the output provided at the automated assistant interface. For instance, the user can provide a responsive spoken utterance such as, "Please response, 'Yes, I'm on the way,'" to an automated assistant interface (e.g., a microphone) of the automobile. The automobile automated assistant can receive audio data corresponding to the responsive spoken utterance, either cause the audio data to be processed locally or transmit the audio data to a separate device for processing. By processing the audio data, the automobile automated assistant can determine whether the user has acknowledged the notification of the text message, and any other action that the user would like to perform. For example, in response to receiving the responsive spoken utterance, the automobile automated assistant can cause a second action intent request to be generated.

The method 400 can proceed to method 410, as indicated by a continuation element "A," encircled at FIGS. 4A and 4B. The method 410 can include an operation 412 of providing, to the client device and in response to determining that the user provided the input, the second action intent request. The second action intent request can identify a second requested action, other content data, and/or the custom identifier associated with the first action intent request. The second requested action can be request to respond to the text message that was received at the messaging application. The other content data can include text that is based on the responsive spoken utterance (e.g., "content-data='text:Yes, I'm on the way"), and the custom identifier can be the same custom identifier from the first action intent request.

The method 410 can further include an operation 414 of causing the second requested action to be performed at the client device by the application using the other content data. For instance, when the action includes transmitting a responsive message, the client device can using the content data in order to generate the responsive message and transmit the responsive message to the person who initially sent the text message to the client device. In order to identify the text message and/or application that the second action intent request corresponds, an instance of the automated assistant at the client device can compare the custom identifier to the custom identifier provided with the first action intent request. Alternatively, or additionally, the automated assistant can identify the messaging application based on whether the messaging application can perform the second requested action, as indicated by a manifest file of the messaging application. The automated assistant at the client device can then cause the messaging application to perform the second requested action, and thereby send the text message corresponding to the responsive spoken utterance.

Figure 5:
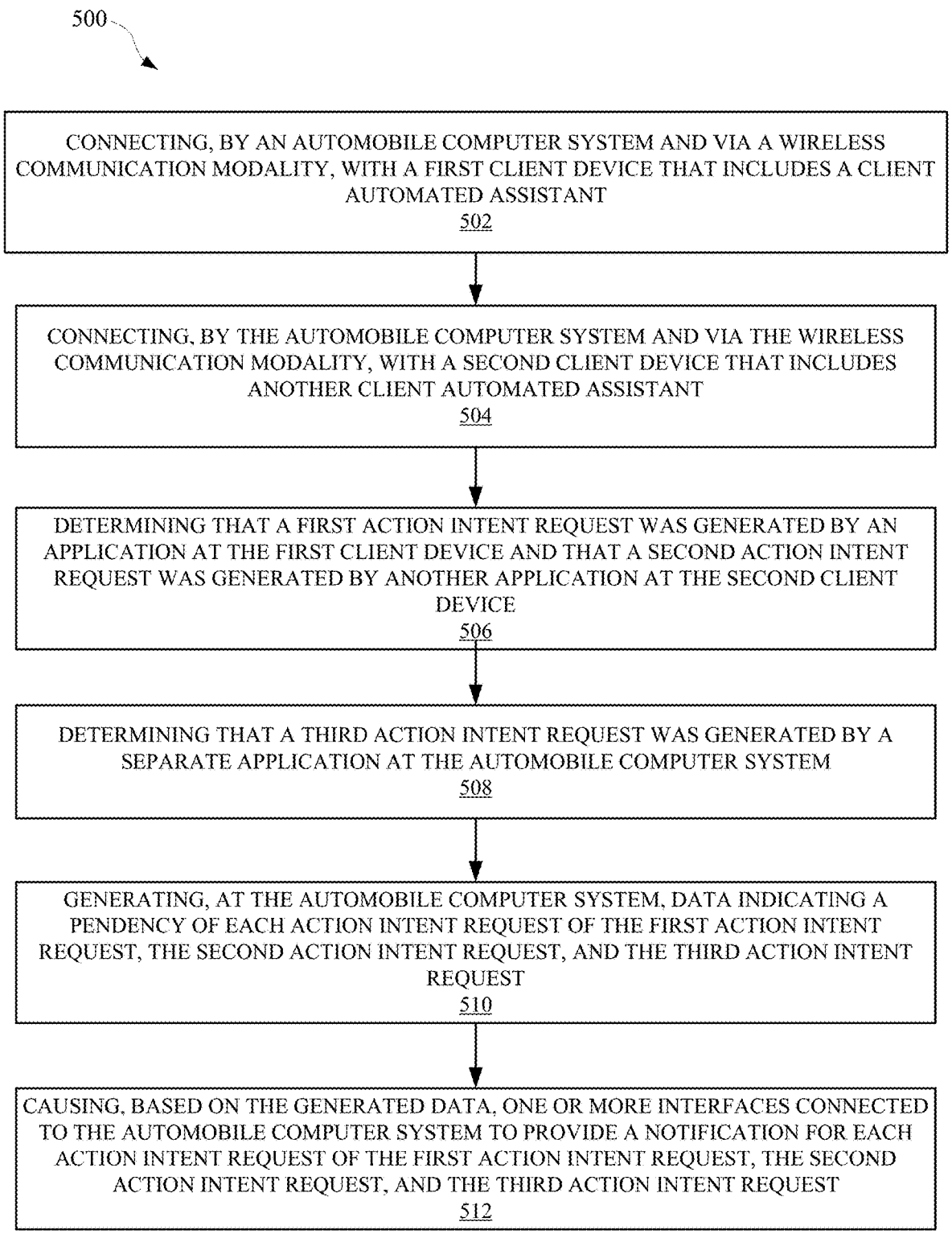
FIG. 5 illustrates a method of providing an output from an interface according to multiple different action intent requests provided from different instances of an automated assistant.

FIG. 5 illustrates a method 500 of providing an output from an interface according to multiple different action intent requests provided from different instances of an automated assistant. The method 500 can be performed by one or more of a computing device, an application, and/or any other apparatus or module capable of interacting with an automated assistant. The method 500 can include an operation 502 of connecting, by an automobile computer system and via a wireless communication modality, with a first client device that includes a client automated assistant. The first client device can be, for example, a portable computing device such as a cell phone or tablet computer, and the automobile computer system can be a computing device that is integral to a vehicle capable of delivering multiple passengers. Furthermore, the wireless modality can be one or more wireless communication protocols such as Bluetooth, Wi-Fi, LTE, and/or any other modality through which multiple computing devices can interact.

The method 500 can further include an operation 504 of connecting, by the automobile computer system, and via the wireless communication modality, with a second client device that includes another client automated assistant. The other client automated assistant can be provided the same or different entity as the client automated assistant, and the second client device can be the same or different type of client device as the first client device. For instance, the first client device can be owned by a driver of the automobile and the second client device can be owned by a passenger of the automobile. Furthermore, operation 502 and operation 504 can be performed when the driver and the passenger of the automobile enter the automobile. In this way, an automobile automated assistant will be able to interact with the client automated assistant and the other client automated assistant when the driver and the passenger are in the automobile.

The method 500 can further include an operation 506 of determining that a first action intent request was generated by an application at the first client device and that a second action intent request was generated by another application at the second client device. The first action intent request can correspond to a request for a notification to be presented to the driver, and the notification can provide information about a message that was received at the first client device. The second action intent request can correspond to a different request for a different notification to be presented to the passenger. The other notification can provide different information about a different message that was received at the second client device.

The method 500 can also include an operation 508 of determining that a third action intent request was generated by a separate application at the automobile computer system. The separate application can be, for example, a maintenance application that monitors one or more sensors of the automobile. Furthermore, the first client device and the second client device can be void of any corresponding instance of the maintenance application. In some implementations, the third action intent request can correspond to a request for a notification to be provided to the driver regarding a condition of the car, such as an oil change being overdue and/or brake fluid needing to be replaced.

The method 500 can also include an operation 510 of generating, at the automobile computer system, data indicating a pendency of each action intent request of the first action intent request, the second action intent request, and the third action intent request. The data can be embodied as or accessible to an event handler engine capable of arranging data corresponding to various different action intent requests from various different applications and/or devices. For instance, the data can identify a priority of each of the action intent requests. A priority for an action intent request can be based on, for example, whether the action intent request was generated at a device that includes a primary automated assistant (i.e., an automated assistant that at least more than one other automated assistants are communicating with). For instance, the primary automated assistant, when the driver and the passenger are riding in the automobile, can be the automobile automated assistant because it is installed at the automobile computer system of the automobile. A next priority can be given to action intent requests that are provided by a device that is associated with the driver of the vehicle, such as the first client device. Thereafter, other priorities can be assigned to action intent requests associated with passengers of the automobile.

The method 500 can further include an operation 512 of causing, based on the generated data, one or more interfaces connected to the automobile computer system to provide a notification for each action intent request of the first action intent request, the second action intent request, and/or the third action intent request. In some implementations, the automobile computer system can include an interface, such as a display panel, at which graphical elements are presented, and one or more of the graphical elements can correspond to either of the action intent requests. Furthermore, the display panel can be a touch interface through which a user can select a graphical element in order to acknowledge a notification and cause another action intent request to be generated at the automobile computer system.

Figure 6:
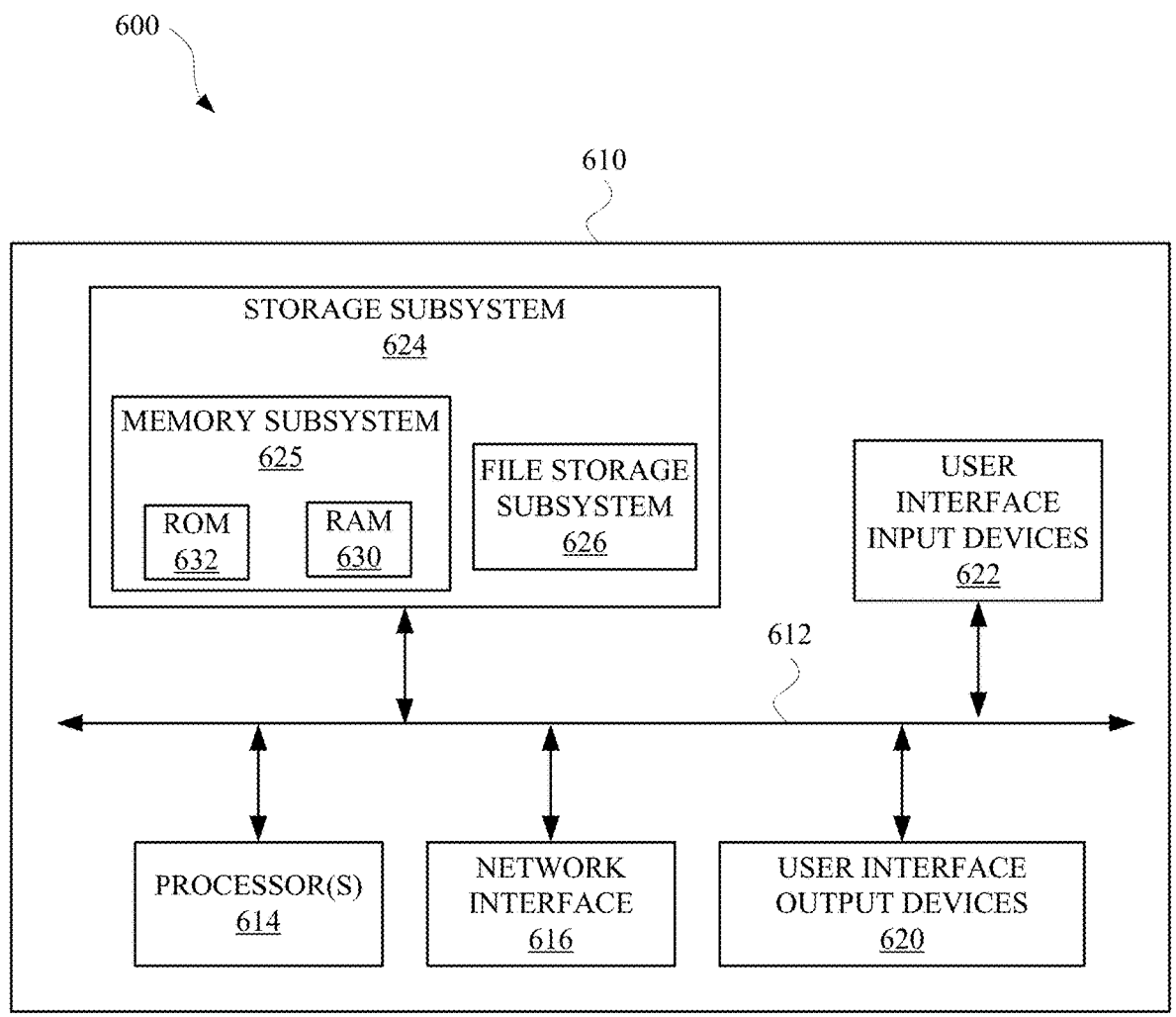
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, and/or to implement one or more of an automobile automated assistant, an automobile computer system, a client automated assistant, a client device, a remote device, a server device, a vehicle, and/or any other module or apparatus discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

Figure 7:
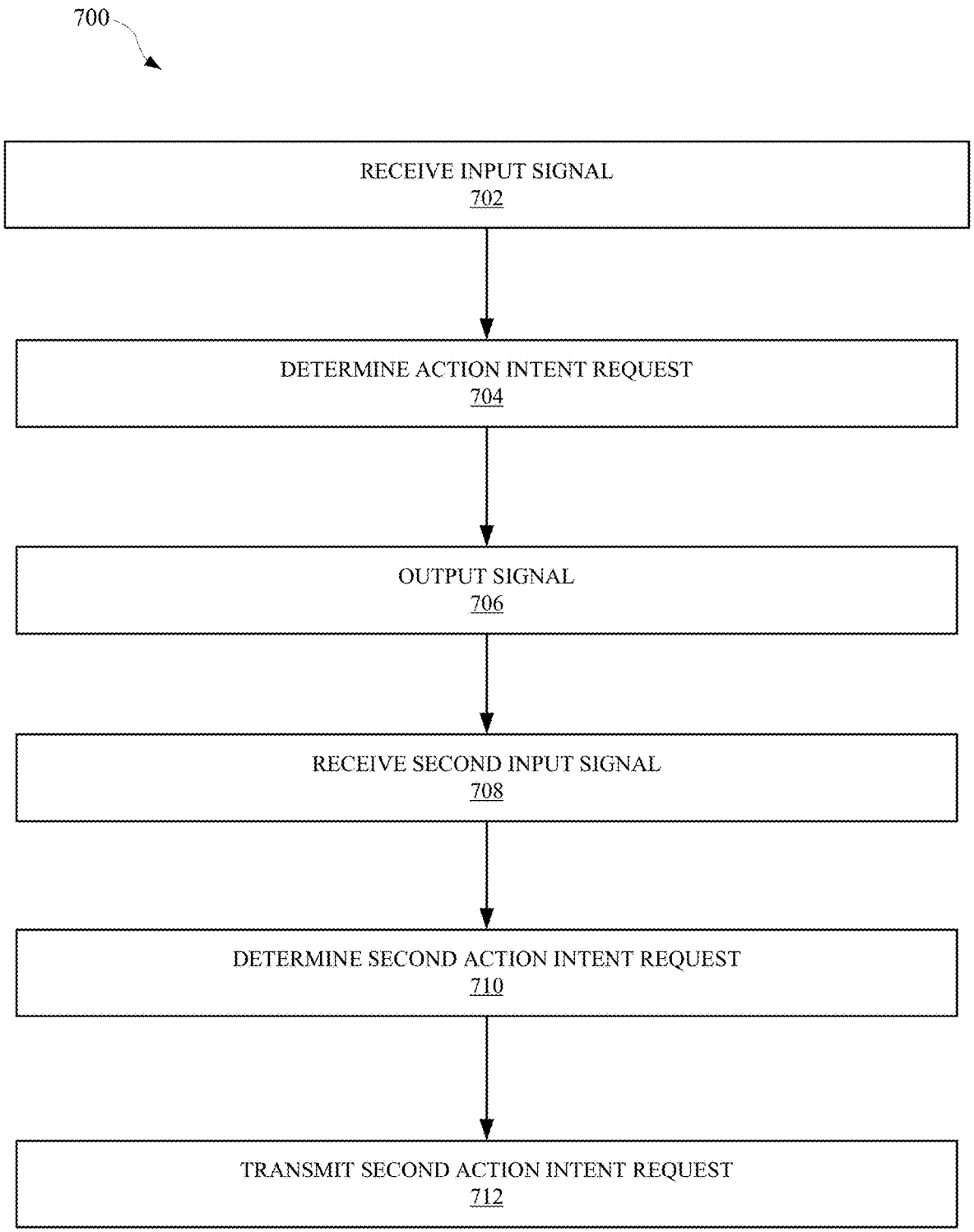
FIG. 7 illustrates an example method to establish communication channels between networked devices.

FIG. 7 illustrates an example method 700 to establish communication channels between networked devices. The method 700 can include receiving an input signal (ACT 702). The method 700 can include determining an action intent request (ACT 704). The method 700 can include generating an output signal (ACT 706). The method 700 can include receiving an input signal (ACT 708). The method 700 can include determining a second action intent request (ACT 710). The method 700 can include transmitting the second action intent request (ACT 712).

As set forth above, the method 700 can include receiving an input signal. The input signal can be an input audio signal. The input signal can be received by an interface of the automobile-based data processing system. The automobile-based data processing system can receive the input signal from a client device. The automobile-based data processing system can receive the input signal from a client device. The client device can be paired with the automobile-based data processing system via the wireless communication channel, such as Bluetooth. The input signal can be detected by a microphone associated with the automobile-based data processing system, such as a microphone installed in the interior of the automobile. The input signal can be received by a natural language processor component that is executed by the automobile-based data processing system. The automobile-based data processing system can receive the audio input for a session corresponding to the conversation. The automobile-based data processing system can receive the input signal from a remote data processing system, such as the service device 230. For example, a microphone of the client device can detect the input signal. The client device can transmit the input signal to the service device 230. The service device can process the input signal. For example, the service device can process the input signal to extract text from the input signal. The input signal or data extracted therefrom can be transmitted to the automobile-based data processing system.

The method 700 can include determining an action intent request (ACT 704). The method 700 can include determining, by the automobile-based data processing system and based on the first input signal, a first action intent request. The action intent request can be an action data structure. For example, the automated assistant can process the input signal to parse the input signal to identify an intent request or other request and one or more keywords in the input signal. The automobile-based data processing system can determine or identify an application associated with the action intent request. The application can be an application on the client device that was involved in capturing the input signal or transmitting the input signal to the automobile-based data processing system. For example, the user may provide an input utterance to a mapping application on the client device for directions. The input utterance can be the input signal and the mapping application can transmit the input signal to the automobile-based data processing system. The automobile-based data processing system can identify the mapping application. The identified application can be an application on the client device capable of fulfilling the intent request. The identifier can include a deep link to the application. Execution of the deep link by the client device can cause the identified application to open at the client device. The deep link can include data that can be prepopulated into one or more fields of the page to which deep causes the application to open. For example, the deep link can include an identification of a mapping application and can include a starting point and a destination that can be populated into a starting and destination fields of the mapping application.

The method 700 can include outputting a signal (ACT 706). The method 700 can include generating the output signal based on the action intent request. The output signal can be an audio-based output signal, a text-based output signal, or an image-based output signal. The automobile-based data processing system can output the output signal. Outputting the signal by the automobile-based data processing system can include transmitting the output signal to the client device. The client device can render the output signal to the user. The automobile-based data processing system can output the output signal by rendering the output signal at the interface of the data processing system.

The method 700 can include receiving a second input signal (ACT 708). The client device can receive the second input signal and transmit the input signal to the automobile-based data processing system. The automobile-based data processing system can directly receive the second input signal. For example, the automobile-based data processing system can be associated with a sensor, such as a microphone, that can detect an input audio signal. A user can generate the spoken utterance of the second input signal in response to the output of the output signal. For example, the second input signal can include a response to a prompt included in the output signal.

The method 700 can include determining a second action intent request (ACT 710). The automobile-based data processing system can determine the second action intent request. The second action intent request can be an action data structure. The automobile-based data processing system can determine the second action intent request based on the second input signal received at ACT 708. For example, the received input signals and the output signal can be signals received by and transmitted from the automobile-based data processing system as part of a session corresponding to a conversation. The second action intent request can include the identifier of the application associated with the first action intent request. The automobile-based data processing system can include a digital component. The digital component can be supplemental content.

The digital component can be a content item selected by the content selector component. For example, the automobile-based data processing system can generate a digital component request and transmit the digital component request to a remote data processing system. The content selector component of the remote data processing system can select the digital component. The remote data processing system can transmit the digital component to the automobile-based data processing system for rendering at an interface of the automobile-based data processing system. The remote data processing system can transmit the digital component to one of the client devices for rendering at an interface of the client devices. The remote data processing system can transmit the digital component to the automobile-based data processing system, which can transmit the digital component to a client device for rendering at the client device. The automobile-based data processing system can include a local cache of digital components, and the content selector component can select the digital component from the local cache of digital components.

The method 700 can include transmitting the second action intent request (ACT 712). The automobile-based data processing system can transmit the second action intent request and the digital component to a client device. The client device, based on receiving the action intent request and digital component, can process the second action intent request with the application identified by the identifier of the second action intent request. The selected digital component can be transmitted to the client device. The selected digital component can be transmitted to the automobile-based data processing system.

The automobile-based data processing system can hold or prevent the transmission of the second action intent request and digital component to the client device. The automobile-based data processing system can prevent the transmission when the automobile is in motion or under conditions when it would not be safe for the user of the client device to view or receive a response or output based on the digital component or action intent request. For example, the automobile-based data processing system can determine that the automobile has stopped and then enable the transmission of the action intent request and digital component to the client device. When the automobile-based data processing system transmits the action intent request to the client device, the automobile-based data processing system can dismiss a pendency of the action intent request at the automobile-based data processing system. The automobile-based data processing system can dismiss a pendency of the action intent request based on receiving a notification message from the client device. For example, the pendency can remain at the automobile-based data processing system until the user views or otherwise interacts with the action intent request at the client device. Based on the interaction, the client device can transmit a notification to the automobile-based data processing system indicating that the user interacted with the action intent request. Based on receiving the notification, the automobile-based data processing system can dismiss the pendency of the action intent request.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A system to establish communication channels among networked devices, comprising:
    a first computing device disposed in a vehicle, the first computing device having one or more processors coupled with memory, to:
        execute a first digital assistant application on the first computing device, the first digital assistant application capable associated with a first plurality of action intent requests;
        establish a connection with a data processing system, the data processing system hosting resources for a second digital assistant application executing on a second computing device, the second digital assistant application associated with a second plurality of action intent requests;
        acquire an input audio signal via a sensor of the first computing system, subsequent to establishment of the connection with the data processing system;
        transmit the input audio signal to the data processing system to parse the input audio signal to identify a digital component and to select an action intent request from the second plurality of action intent requests;
        receive, from the data processing system, the digital component and the action intent request;
        process, via the first digital assistant application, the action intent request selected from the second plurality of action intent requests of the second digital assistant application to generate an output; and
        present the digital component and the output based on the processing of the action intent request.

2. The system of claim 1, comprising the first computing device to:
    receive the action intent request including an identifier of the second digital assistant application associated with the action intent request, the action intent request available to be performed by the first digital assistant application responsive to the establishment of the connection; and
    process, using the second digital assistant application identified in the identifier, the action intent request to generate the output.

3. The system of claim 1, comprising the first computing device to:
    identify, responsive to establishing the connection with the data processing system, that the second digital assistant application is supported by the data processing system; and
    transmit, via the connection, a second action intent request to the data processing system to process the second action intent request using the second digital assistant application identified in the second action intent request.

4. The system of claim 1, comprising the first computing device to:
parse the input audio signal to identify the second digital assistant application associated with the action intent request; and
transmit, responsive to the identification of the second digital assistant application, the input audio signal to the data processing system.

5. The system of claim 1, comprising the first computing device to:
identify a priority of a second action intent request determined using a second input audio signal, the second action intent request including an identifier of at least one of the first digital assistant application or the second digital assistant application; and
process, in accordance with the priority and the identifier, the second action intent request to generate a second output.

6. The system of claim 1, comprising the first computing device to:
identify data indicating a plurality pendencies of a corresponding plurality of action intent requests to be processed via the first digital assistant application;
present an interface including the data, the interface including an element to select dismissal of a pendency of the plurality of pendencies; and
provide, responsive to a selection of the element of the interface, an indication of the dismissal to the data processing system to terminate a corresponding action intent request of the plurality of action intent requests.

7. The system of claim 1, comprising the first computing device to:
identify, via a vehicle sensor coupled with the first computing device, a condition of the vehicle in which the first computing device is disposed; and
process a second intent action request to present an output indicating the condition of the vehicle.

8. A system to establish communication channels among networked devices, comprising:
a data processing system having one or more processors coupled with memory to:
establish a first connection with a first computing device disposed in a vehicle, the first computing device executing a first digital assistant application, the first digital assistant application capable associated with a first plurality of action intent requests;
establish a second connection with a second computing device, the second computing device executing a second digital assistant application, the second digital assistant application capable associated with a second plurality of action intent requests;
receive, via the first connection from the first computing device, an input audio signal acquired via a sensor of the first computing system, subsequent to establishment of the connection with the data processing system;
identify, from a plurality of digital components, a digital component based on parsing of the input audio signal; and
select, from the first plurality of action intent requests and the second plurality of action intent requests, an action intent request based on the parsing of the input audio signal; and
provide, via the first connection to the first computing device, the digital component and the action intent request to present the digital component and an output corresponding to the action intent request via the first computing device.

9. The system of claim 8, comprising the data processing system to permit, responsive to establishment of the first connection and the second connection, selection from the first plurality of action intent requests and the second plurality of action intent requests for the first computing device.

10. The system of claim 8, comprising the data processing system to provide the action intent request including an identifier of the second digital assistant application associated with the action intent request, to the first computing device to process the action intent request to generate the output using the second digital assistant application identified in the identifier.

11. The system of claim 8, comprising the data processing system to receive, via the first connection from the first computing device, a second action intent request associated with the second digital assistant application, responsive to the first computing device identifying that the second digital assistant application is supported by the data processing system.

12. The system of claim 8, comprising the data processing system to provide, via the first connection to the first computing device, a priority of a second action intent request determined using a second input audio signal, to the first computing device to process the second action intent request to generate a second output in accordance with the priority and the second action intent.

13. The system of claim 8, comprising the data processing system to provide, via the first connection to the first computing device, data indicating a plurality pendencies of a corresponding plurality of action intent requests to be processed via the first digital assistant application.

14. A method of establishing communication channels among networked devices, comprising:
executing, by a first computing device disposed in a vehicle, a first digital assistant application on the first computing device, the first digital assistant application capable associated with a first plurality of action intent requests;
establishing, by the first computing device, a connection with a data processing system, the data processing system hosting resources for a second digital assistant application executing on a second computing device, the second digital assistant application associated with a second plurality of action intent requests;
acquiring, by the first computing device, an input audio signal via a sensor of the first computing system, subsequent to establishment of the connection with the data processing system;
transmitting, by the first computing device, the input audio signal to the data processing system to parse the input audio signal to identify a digital component and to select an action intent request from the second plurality of action intent requests;
receiving, by the first computing device, from the data processing system, the digital component and the action intent request;
processing, by the first computing device, via the first digital assistant application, the action intent request selected from the second plurality of action intent requests of the second digital assistant application to generate an output; and presenting, by the first computing device, the digital component and the output based on the processing of the action intent request.

15. The method of claim 14, comprising:
receiving, by the first computing device, the action intent request including an identifier of the second digital assistant application associated with the action intent request, the action intent request available to be performed by the first digital assistant application responsive to the establishment of the connection; and
processing, by the first computing device, using the second digital assistant application identified in the identifier, the action intent request to generate the output.

16. The method of claim 14, comprising:
identifying, by the first computing device, responsive to establishing the connection with the data processing system, that the second digital assistant application is supported by the data processing system; and
transmitting, by the first computing device, via the connection, a second action intent request to the data processing system to process the second action intent request using the second digital assistant application identified in the second action intent request.

17. The method of claim 14, comprising:
parsing, by the first computing device, the input audio signal to identify the second digital assistant application associated with the action intent request; and
transmitting, by the first computing device, responsive to the identification of the second digital assistant application, the input audio signal to the data processing system.

18. The method of claim 14, comprising:
identifying, by the first computing device, a priority of a second action intent request determined using a second input audio signal, the second action intent request including an identifier of at least one of the first digital assistant application or the second digital assistant application; and
processing, by the first computing device, in accordance with the priority and the identifier, the second action intent request to generate a second output.

19. The method of claim 14, comprising:
identifying, by the first computing device, data indicating a plurality pendencies of a corresponding plurality of action intent requests to be processed via the first digital assistant application;
presenting, by the first computing device, an interface including the data, the interface including an element to select dismissal of a pendency of the plurality of pendencies; and
providing, by the first computing device, responsive to a selection of the element of the interface, an indication of the dismissal to the data processing system to terminate a corresponding action intent request of the plurality of action intent requests.

20. The method of claim 14, comprising:
identifying, by the first computing device, via a vehicle sensor coupled with the first computing device, a condition of the vehicle in which the first computing device is disposed; and
processing, by the first computing device, a second intent action request to present an output indicating the condition of the vehicle.

* * * * *